United States Patent
Li et al.

(10) Patent No.: US 8,206,624 B2
(45) Date of Patent: Jun. 26, 2012

(54) METHOD FOR PRODUCING CARBON NANOTUBE

(75) Inventors: Yuan-Yao Li, Min-Hsiung (TW); Chao-Wei Huang, Fengyuan (TW)

(73) Assignee: National Chung Cheng University, Chia-Yi County (TW)

(*) Notice: Subject to any disclaimer, the term of this patent is extended or adjusted under 35 U.S.C. 154(b) by 195 days.

(21) Appl. No.: 12/367,505

(22) Filed: Feb. 7, 2009

(65) Prior Publication Data

US 2009/0257944 A1    Oct. 15, 2009

Related U.S. Application Data

(63) Continuation-in-part of application No. 10/998,253, filed on Nov. 26, 2004, now abandoned.

(51) Int. Cl.
*C01B 31/00* (2006.01)
*D01F 9/12* (2006.01)

(52) U.S. Cl. ............ 264/29.6; 264/29.2; 264/29.7; 977/742; 977/750; 977/752; 977/842; 977/845; 423/447.1; 423/447.2; 423/447.4; 423/447.8; 423/460

(58) Field of Classification Search .................. None
See application file for complete search history.

(56) References Cited

U.S. PATENT DOCUMENTS

| | | | | |
|---|---|---|---|---|
| 3,917,776 | A * | 11/1975 | Sato et al. | 423/447.5 |
| 7,045,083 | B2 * | 5/2006 | Gardner | 264/102 |
| 7,718,156 | B2 * | 5/2010 | Zhang et al. | 423/445 R |
| 7,790,135 | B2 * | 9/2010 | Lennhoff | 423/447.1 |
| 7,819,938 | B2 * | 10/2010 | Keller et al. | 75/252 |
| 2003/0111334 | A1 * | 6/2003 | Dodelet et al. | 204/164 |
| 2003/0181328 | A1 * | 9/2003 | Hwang et al. | 502/325 |
| 2005/0100499 | A1 * | 5/2005 | Oya et al. | 423/447.1 |
| 2010/0112322 | A1 * | 5/2010 | Kumar et al. | 428/220 |
| 2010/0120969 | A1 * | 5/2010 | Tsotsis | 524/496 |

OTHER PUBLICATIONS

Cho et al., Synthesis of carbon nanotubes from bulk polymer, Appl. Phys. Lett., vol. 69 (2), Jul. 8, 1996, pp. 278-279.*

* cited by examiner

*Primary Examiner* — Jeffrey Wollschlager

(74) *Attorney, Agent, or Firm* — Lin & Associates IP, Inc.

(57) ABSTRACT

A method for producing carbon nanotubes uses a polymer as a raw material to undergo in situ thermal decomposition. The method includes steps of mixing the polymer and metallic catalyst through a multiple heating stage process of in-situ thermal decomposition to carbonize the polymer and release carbon elements to produce carbon nanotubes. Advantages of the present invention include easy to prepare, low temperature in manipulation, low production cost, and high safety.

13 Claims, 4 Drawing Sheets

METHOD FOR PRODUCING CARBON NANOTUBE

CROSS-REFERENCES TO RELATED APPLICATIONS

This is a continuation-in-part application for the application Ser. No. 10/998,253 filed on Nov. 26, 2004, now abandoned, which is incorporated herewith by reference.

BACKGROUND OF THE INVENTION

1. Field of the Invention

The present invention relates to a method for producing carbon nanotubes (CNTs). Especially, the present invention relates to a method performing in-situ thermal decomposition of polymers to produce carbon nanotubes.

2. The Prior Arts

Nanotechnology is one of the most important top technologies in this century, which is also a science technology evoked by new industrial revolution. This emerging technique is attractive at present and is gradually displayed in an attitude of changing the basic research fields of information technology, biological science, environmental science, energy source, material science and so on. The trend of industrial elements toward small features, high density, fast transmission, low energy cost and high production rate results in the further needs of element materials. Therefore, nanomaterial containing nanostructure becomes the best material to fulfill the abovementioned needs. Recently, nanomaterials gradually become arresting, one of the most bodacious, being broadly discussed and applied material is carbon nanotubes.

Since their discovery in nineties, carbon nanotubes have been attracting much attention due to their special cylinder like structure constructed of hexagonal array, as well as the unique electrical, magnetic, optic characteristics and the potential applications. The fields of carbon nanotube applications include photo-electric elements, electric elements, biomedical science, energy materials, and artificial diamonds, etcetera. International technology and industry are all emphasized on this technology without regard to countries or research fields, such as IBM Company and NASA in USA, NEC and Shawa Denko Companies in Japan, and Max-Planck Institute in Germany are focused very broadly and deeply in the field of carbon nanotubes and their applications. The reports on new research of carbon nanotubes are competing internationally.

On the other hand, due to high aspect ratio and small tip radii of curvature, carbon nanotubes are very suitable for electron field emission. Carbon nanotube materials are alternatives to conventional metallic microtips in field emission display (FED) application for high luminance and efficiency. In the application of recording media, carbon nanotubes can be used in recording head with memory of terabyte scale (1 Terabyte=1,000 Gegabytes). Moreover, carbon nanotubes are the basic materials of other nanostructures, such as the synthesizing templates of nanowire and nanorod.

The existing production methods of carbon nanotubes include arc discharge, chemical vapor deposition (CVD), pulsed laser deposition, plasma enhanced CVD, microwave plasma CVD and laser ablation and so on, among which arc discharge and chemical vapor deposition are commonly used. These two methods need high temperatures (typically more than 1000° C.), high production cost, and the starting procedures and process procedures are more complex and with higher risk. Accordingly, it is desirable to develop an improved method of producing carbon nanotubes with which the process can be operated easily and performed at low working temperature and has high safety to eliminate abovementioned problems in the prior arts.

SUMMARY OF THE INVENTION

A primary object of the present invention is to provide a method for production of carbon nanotubes, which is advantageous for simplifying the production process and lowering the production cost.

Another object of the present invention is to provide a method for lowering the reaction temperature, and not adding hydrocarbon gas for fabricating carbon nanotubes to lower the risk of carbon nanotubes production.

Yet another object of the invention is to provide a carbon nanotube producing method that uses in-situ thermal decomposition to synthesize carbon nanotubes in desired sites and be applied in production of advanced nano-device.

To accomplish and fulfill the abovementioned objects of the present invention, in-situ thermal decomposition is used to produce carbon nanotubes. The present invention uses a polymer as a carbon source, and mixes the polymer with a metallic catalyst to perform in situ decomposition. Solvent removal, hydrogen removal, thermal decomposition, carbonization and graphitization in the mixture are performed with a rising high temperature. The polymer reacts with the metallic catalyst to release carbons and produce carbon nanotubes.

The existing production methods are disadvantageous for their high working temperatures, high production cost, complicated procedures and higher risk. Contrary to the prior art, the present invention provides a method using in-situ thermal decomposition to synthesize carbon nanotubes, which is simple and safe in the production process and without the drawbacks mentioned above.

The advantages of the method using in-situ thermal decomposition to produce carbon nanotubes are summarized as follows:

(1) The carbon source is obtained from the decomposed polymers but not from added hydrocarbons (such as methane and ethane, and so on).

(2) Heating process is completed in a lower temperature (400-1000° C.) to prepare carbon nanotubes.

The abovementioned and other purposes of the present invention, characteristics and advantages will be obvious and clear after referring to the detailed description, preferred embodiment and the attached figures.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Example 1

Figure 1:
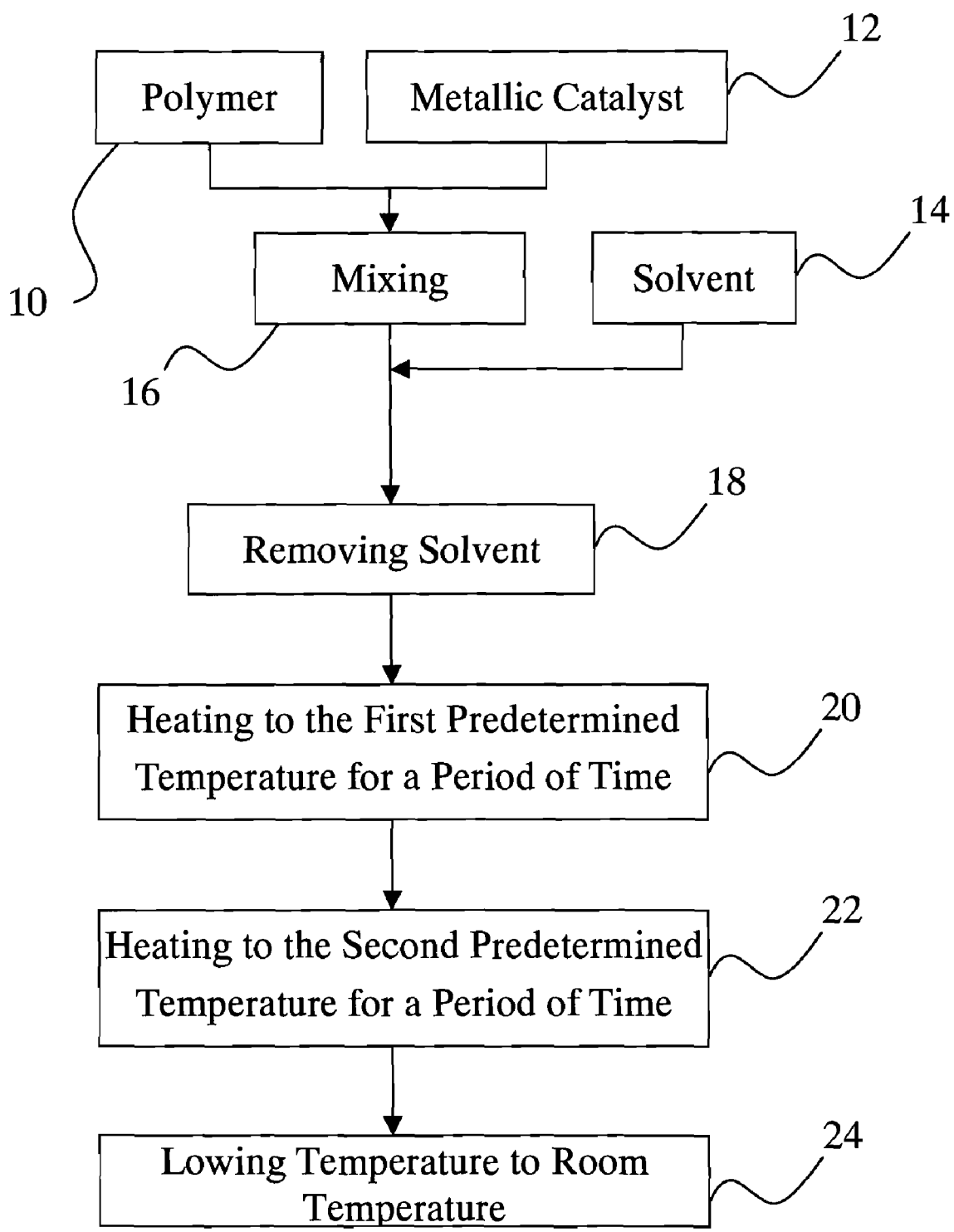
FIG. 1 shows a flow chart of a method for producing carbon nanotubes in accordance with a preferred embodiment of the present invention.

FIG. 1 shows a flow chart of a preferred example in carbon nanotubes producing method according to the present invention. Procedures provided in the method include the following steps.

In a mixing step (16), polymer (10) and metallic catalyst (12) are mixed thoroughly with solvent (14) (for examples, organic solvent or water). After solvent removing step (18), mixture of polymer (10) and metallic catalyst (12) is obtained. Alternatively, a mixture of polymer and metallic catalyst is heated to a temperature above the melting point of the polymer to become liquid form, and the metallic catalyst is dispersed uniformly in the polymer, which is not shown in the figure.

The example of polymer (10) applied in the present invention may be polyethylene glycol (PEG), but is not limited to it.

The preferred metallic catalysts used in the present invention are metallic particles or metallic compounds. For example, the metallic particles may be iron, cobalt, or nickel; and the metallic compounds may be compounds of iron, cobalt, or nickel, or salts of iron, cobalt, or nickel and so on. Especially, examples of the metallic compounds include, but not limited thereto, ferrosoferric oxide ($Fe_3O_4$), ferric oxide ($Fe_2O_3$), ferric sulfate ($Fe_2(SO_4)_3$), ferric hydroxide (FeO(OH)), ferric nitrate ($Fe(NO_3)_3$), nickel nitrate ($Ni(NO_3)_2$), nickel sulfate hexahydrate ($NiSO_4.6H_2O$)), or cobalt nitrate hexahydrate ($Co(NO_3)_2.6H_2O$)) and so on.

The amount of metallic catalysts used to obtain carbon nanotubes of better quality is preferably 0.05 to 10% (w/w) based on the amount of polymer used, and more preferably 0.1 to 1% (w/w). On the other hand, there is no limitation to remove solvent used in the mixing step. Any methods known to remove solvents from solution mixture can be applied in the present invention, for example, evaporating the solvent by heating under a pressure of 0.1 MPa. In addition, the mixture can be made in forms of film, powder, arrays or bulk as needed before removing the solvent. The application fields of carbon nanotubes can be broadened because the mixture can be shaped into the desired forms corresponding to various usages.

Then, a first heating stage is performed by heating the mixture to a first predetermined temperature for a period of time under a pressure of 0.1 MPa, step (20), to dehydrogenate and remove undesired evaporating products. The heating temperature of the first heating stage is preferably between 200-400° C., and more preferably between 250-350° C. The heating rate from room temperature to the first predetermined temperature is not particularly specified. However, to make carbon nanotubes of higher quality, the heating rate from room temperature to the first predetermined temperature is preferably at 0.5 to 20° C. per minute, more preferably at 2 to 5° C. per minute under a pressure of 0.1 MPa. And the heating time under the predetermined heating temperature is preferably 0.5 to 10 hours, more preferably 1 to 5 hours.

A second heating stage is carried out by heating the mixture to a second predetermined temperature for a period of time, step (22), after the first heating stage to allow polymers to process thermal decomposition. At this moment, the bondage structures between polymer molecules are broken, hydrogen and oxygen atoms are free from the polymer structures, and carbon elements are obtained. Finally, the temperature is reduced to room temperature, step (24), to obtain carbon nanotubes with inert gas flowed. The second predetermined temperature is preferably between 400-1000° C., and more preferably between 600-800° C. The heating rate from the first predetermined temperature to the second predetermined temperature, and the heating period after reaching the second predetermined are not particularly specified. However, to make carbon nanotubes of higher quality, the heating rate from the first predetermined temperature to the second predetermined temperature is preferably carried out at 0.5 to 20° C. per minute, more preferably at 2 to 5° C. per minute, which can be the same or different from that of the first stage. And the heating period after reaching the second predetermined temperature is preferably 0.5 to 10 hours, more preferably 1-5 hours.

In addition, the reaction chamber is filled with an inert gas to avoid other undesired reactions, preferably. Examples of the inert gas comprise, but not limited thereto, nitrogen ($N_2$), helium (He), argon (Ar), and so on. In order to obtain high yield of carbon nanotubes, before raising temperature to the first predetermined during thermal decomposition, the air is filled into the chamber and then replaced with the inert gas.

The producing method of the present invention is based on multiple stages with various heating temperatures at a normal pressure of 0.1 MPa during polymer thermal decomposition. A first thermal decomposition is carried out at a lower temperature, and then another stage of thermal decomposition at a higher temperature is performed, which produces carbon nanotubes with better quality and be more homogenous. The two thermal decompositions performed in the multiple stages are at a normal pressure of 0.1 MPa.

Figure 2A:
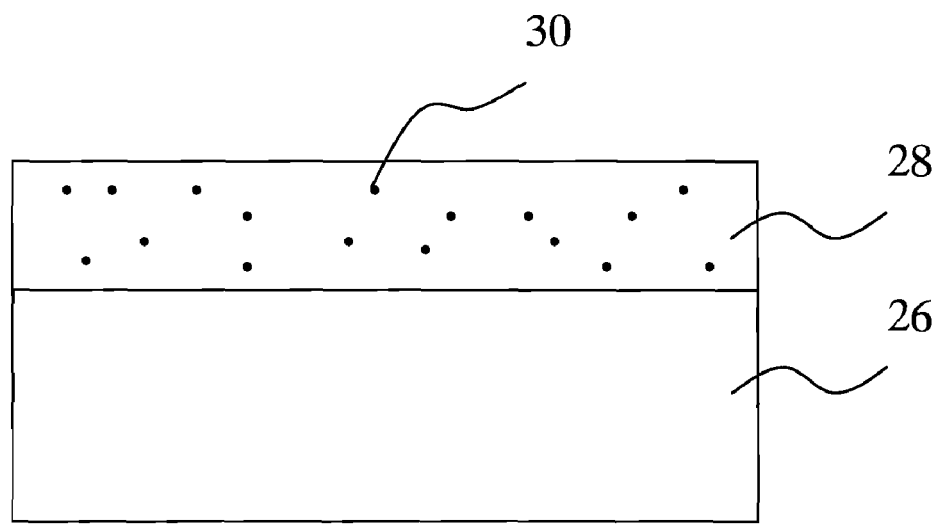
FIG. 2A shows a schematic cross section of a polymer film before heating in carbon nanotubes producing procedures according to FIG. 1.
Figure 2B:
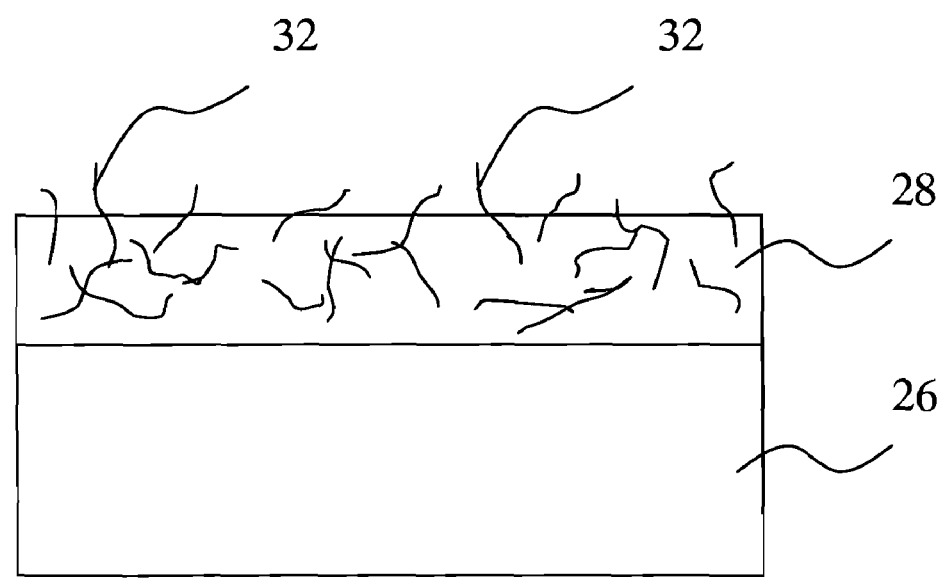
FIG. 2B shows a schematic cross section illustration of a polymer film after heating in carbon nanotubes producing procedures according to FIG. 1.

FIG. 2A and FIG. 2B show a schematic cross section illustration of carbon nanotube produced by a polymer film before and after heating according to FIG. 1, respectively.

As shown in FIG. 2A, a thin film (28) containing the mixture of polymer and metallic catalyst (30) is spread on a base plate (26). The polymer is selected from PEG, and metallic catalyst (30) is metallic particle or metallic compound. Examples of the former are iron, cobalt, nickel; and the latter may be compounds of iron, cobalt, and nickel, or salts of iron, cobalt, nickel, and so on. Specifically, the metallic compounds may be Iron(II, III) oxide ($Fe_3O_4$), Iron(III) oxide ($Fe_2O_3$), ferric sulfate ($Fe_2(SO_4)_3$), ferric hydroxide (FeO(OH)), ferric nitrate ($Fe(NO_3)_3$), nickel nitrate ($Ni(NO_3)_2$), nickel sulfate hexahydrate ($NiSO4.6H_2O$)), or cobalt nitrate hexahydrate ($Co(NO_3)_2.6H_2O$)). The amount of metallic catalyst used is preferably 0.05 to 10% (w/w) based on the amount of polymer used. In addition, the material of base plate needs to be thermal resistant and inertia material, such as silicon chip, aluminum oxide board, silicon board, silicon dioxide board.

As shown in FIG. 2B, carbon nanotubes (32) fabricated in the thin film of the base plate (26) are highly regular in size and quality after abovementioned heating steps during thermal decomposition.

The carbon nanotubes producing method through in situ thermal decomposition can be carried out in temperature below 1000° C. (in comparison to Chemical Vapor Deposition and electric arc discharge), and uses polymer as carbon source at low cost, which makes the production cost relatively and effectively reduced. Moreover, only use of inert gas, no additional hydrocarbon compounds (for example, methane and ethane), low working temperature, and no need of high voltages offer increased safety to a large extent. In addition, the present invention uses the decomposed polymers but not adding hydrocarbons as carbon sources, and performs multiple heating stages to produce carbon nanotubes that may be in many different forms, such as bamboo-like carbon nanotubes (bamboo-like CNTs), multi-walled carbon nanotubes (MWNTs), spiral carbon nanotubes (spiral CNTs).

The present invention produces carbon nanotubes having diameters ranging between 20 nm to 60 nm, and length is about several micrometers (μm). Observation using transmission electron microscopy (TEM) image reveals that the carbon nanotubes prepared according to the present invention have a hollowed multi-walled structure.

Example 2

Polyethylene glycol is mixed with ferric sulfate, whose amount is 0.1-1% (w/w) based on the amount of polyethylene glycol. Later, a solvent (for example, organic solvent or water) is added to make the two components mixed uniformly. The solvent is removed later to have a uniform mixture of polymer and metallic catalyst.

The abovementioned polymer mixture is spread over an inert plate, such as plate of aluminum oxide, silicon wafer, and silicon dioxide, which is dried to a constant weight thereafter.

The base plate spread with polymer mixture is put into a high temperature stove heated to a predetermined temperature to perform thermal decomposition. First, the chamber is filled with air, and heated at a rate of 0.5-20° C. per min till the first predetermined temperature (about 200-400° C.) of the first stage, and stayed for 1 to 5 hours at the temperature. Before the first stage of heating, the inert gas (such as nitrogen (N2), helium (He), neon (Ne), or argon (Ar)) is filled into the chamber to replace the air. After the first heating stage, the heating rate of 0.5-20° C. per min is again employed to the second predetermined temperature (about 600-800° C.) of the second stage. The heating time of the second stage is 1 to 5 hours for thermal decomposition to fabricate carbon nanotubes.

Figure 3:
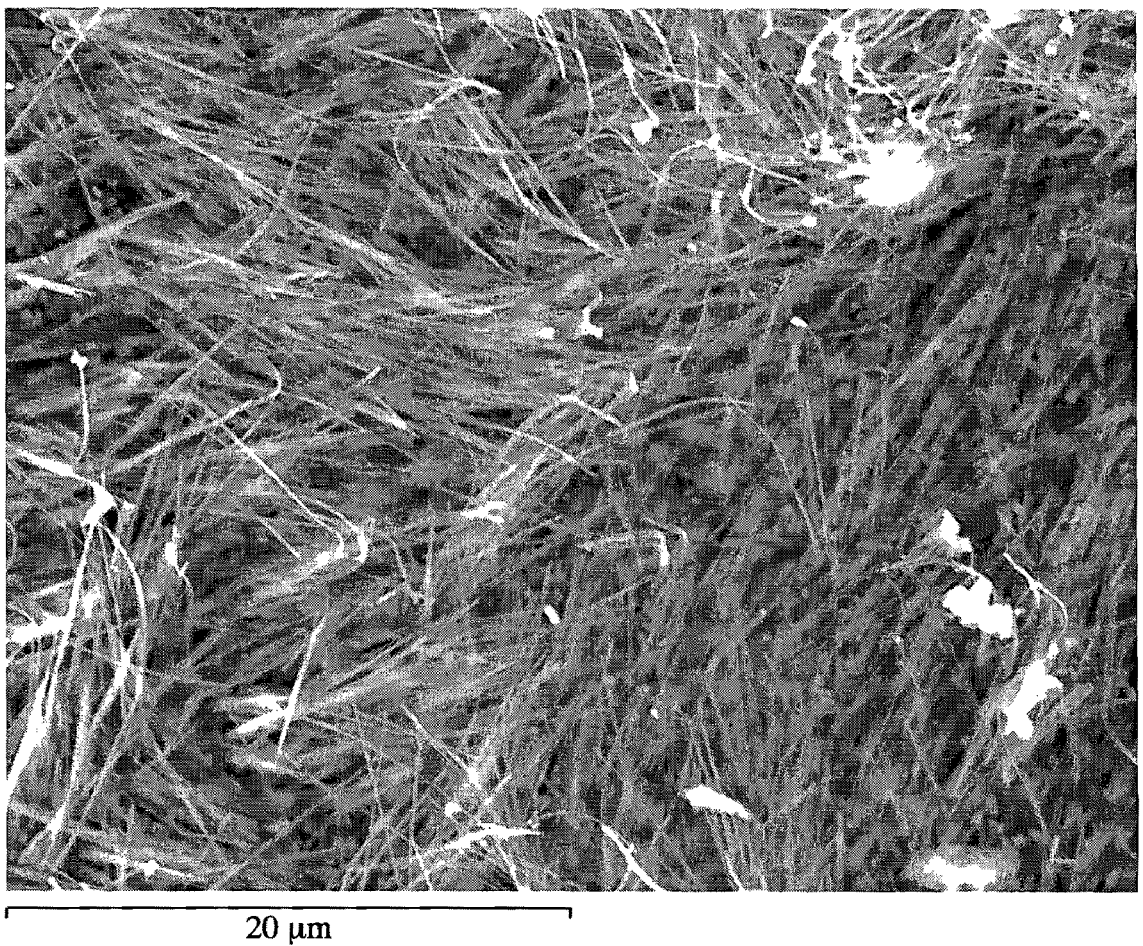
FIG. 3 shows a scanning electron micrograph (SEM) of carbon nanotubes produced according to the present invention.
Figure 4:
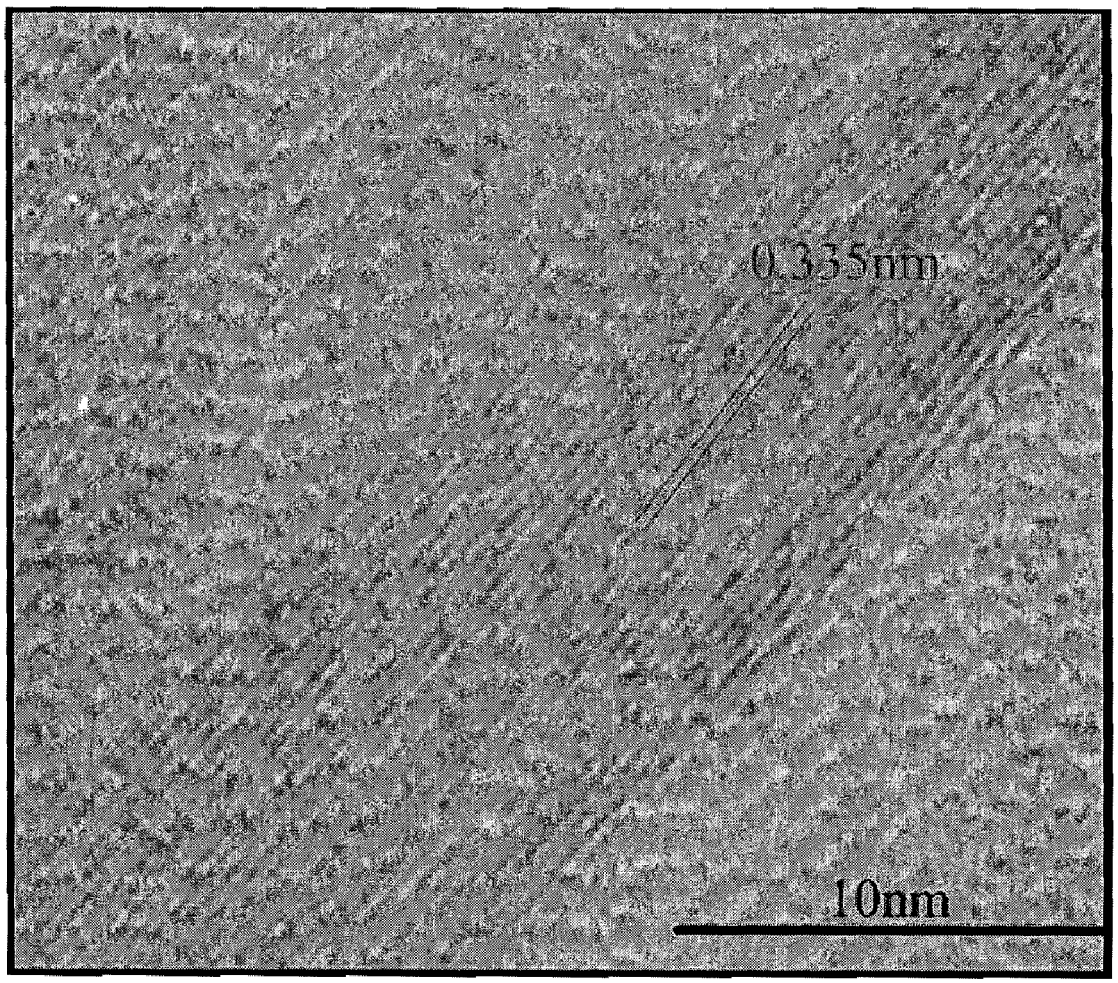
FIG. 4 shows a transmission electron micrograph (TEM) of carbon nanotubes produced according to the present invention.

The images of the abovementioned thermal decomposed products are observed and analyzed with a scanning electron microscope (SEM) and a transmission electron microscope (TEM), as shown in FIG. 3 and FIG. 4.

From the abovementioned descriptions and the figures of FIG. 3 and FIG. 4, it is clear that the carbon nanotubes producing method according to the present invention is easy and safer to prepare, works in low temperature at a normal pressure of 0.1 MPa, which also prepares carbon nanotubes with good quality.

What is claimed is:

1. A method for preparing carbon nanotubes consisting of the steps of:
    (a) mixing uniformly a polymer and a metallic catalyst with a solvent to form a mixture;
    (b) spreading the mixture on a base plate at a pressure of 0.1 Mpa and drying the mixture by removing the solvent at a pressure of 0.1 MPa; and
    (c) heating the dried mixture with a multiple heating stage process at a pressure of 0.1 MPa in a reaction chamber filled with an inert gas to form the carbon nanotubes, the multiple heating stage process including a first heating stage at a first predetermined temperature in a range from 200° C. to less than 400° C. at the pressure of 0.1 MPa, and a second heating stage at a second predetermined temperature of 400-800° C. at the pressure of 0.1 MPa to carry out thermal decomposition.

2. The method as claimed in claim 1, wherein the solvent comprises organic solvent or water.

3. The method as claimed in claim 1, wherein the metallic catalyst is selected from the group consisting of iron, cobalt and nickel.

4. The method as claimed in claim 1, wherein the metallic catalyst is selected from the group consisting of compounds of cobalt.

5. The method as claimed in claim 1, wherein the metallic catalyst is selected from the group consisting of salts of iron, cobalt, and nickel.

6. The method as claimed in claim 5, wherein the metallic catalyst is selected from the group consisting of $Fe_2(SO_4)_3$, $Fe(NO_3)_3$, $NiSO_4 \cdot 6H_2O$, and $Co(NO_3)_2 \cdot 6H_2O$.

7. The method as claimed in claim 1, wherein an amount of metallic catalyst used is 0.05-10% based on the polymer used.

8. The method as claimed in claim 1, wherein the inert gas is selected from the group consisting of nitrogen, helium, neon and argon.

9. The method as claimed in claim 1, wherein a heating time at the first predetermined temperature in the first heating stage is between 0.5 to 10 hours.

10. The method as claimed in claim 1, wherein a heating time at the second predetermined temperature in the second heating stage is between 0.5 to 10 hours.

11. The method as claimed in claim 1, wherein a heating rate from room temperature to the first predetermined temperature is 0.5 to 20° C. per minute.

12. The method as claimed in claim 1, wherein a heating rate from room temperature to the second predetermined temperature 0.5 to 20° C. per minute.

13. The method as claimed in claim 1, wherein the carbon nanotubes are selected from the group consisting of bamboo-like carbon nanotubes, multi-walled carbon nanotubes (MWNT) and spiral carbon nanotubes.

* * * * *